Figure 1:
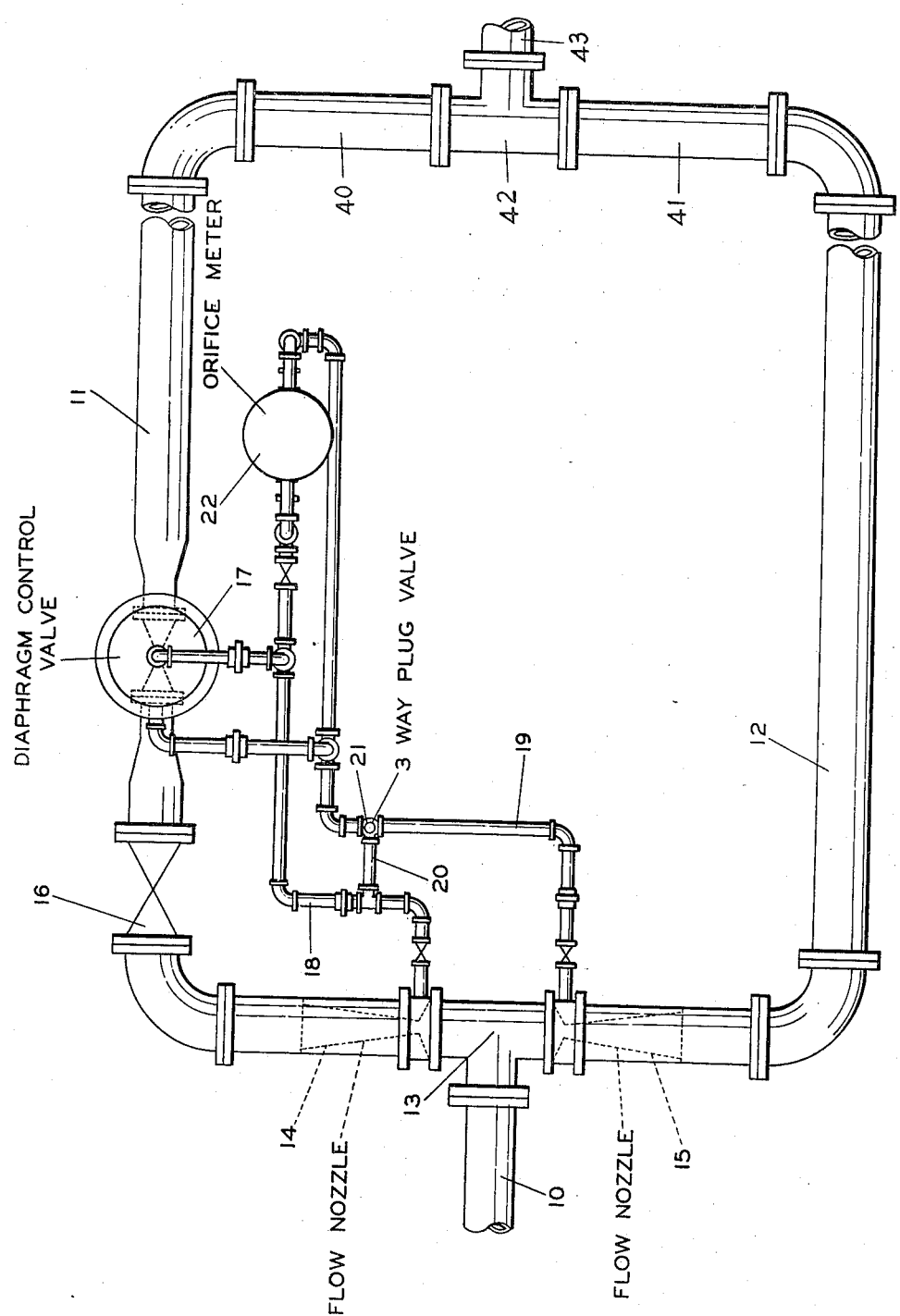

Oct. 31, 1944.  G. P. JENNINGS  2,361,478
APPARATUS FOR CONTROLLING THE RELATIVE RATE OF FLOW IN PIPE-LINE LOOPS
Filed Sept. 4, 1942  2 Sheets-Sheet 1

INVENTOR
GERALD P. JENNINGS
BY
Hudson, Young and Yinger
ATTORNEYS

Oct. 31, 1944.　　　G. P. JENNINGS　　　2,361,478
APPARATUS FOR CONTROLLING THE RELATIVE RATE OF FLOW IN PIPE-LINE LOOPS
Filed Sept. 4, 1942　　　2 Sheets-Sheet 2

INVENTOR
GERALD P. JENNINGS
BY
ATTORNEYS

Patented Oct. 31, 1944

2,361,478

UNITED STATES PATENT OFFICE 2,361,478

APPARATUS FOR CONTROLLING THE RELATIVE RATE OF FLOW IN PIPE-LINE LOOPS

Gerald P. Jennings, Bartlesville, Okla., assignor to Phillips Petroleum Company, a corporation of Delaware Application September 4, 1942, Serial No. 457,358

3 Claims. (Cl. 137—166)

My invention relates to means for controlling the rate of flow through pipe-line loops. More particularly, I disclose an apparatus which is especially suited to retain equal velocities of flow in a pair of parallel pipe-line branches, for the purpose of preventing admixture between successive consignments of different products carried simultaneously in the line.

It is common in the art of transporting petroleum products in pipe-lines to transport different products simultaneously in the same pipe-line. At any one time, for example, a hypothetical pipe-line of 100 miles total length might contain a 30 mile "slug" or consignment of gasoline, a succeeding slug of furnace oil of 50 mile length, followed in turn by a 20 mile section of butane.

It is also common in the art to provide a parallel line, commonly known as a "loop" in certain sections of a single pipe-line. Thus the hypothetical 100 mile pipe-line, which may be a nominal 12-inch line for example, may have one or several sections wherein the line divides into two 12-inch lines for some distance, beyond which the two lines again merge into a single line. Or in some cases, a 12-inch line may be split into two 8-inch or into an 8-inch and a 12-inch line. These double-line portions of a pipe line are known as loops, and are for the purpose of increasing the overall capacity of the line, or may have for their purpose the reduction of resistance to flow due to friction and differences of elevation between certain points in the line.

As long as a homogeneous product is passing through a loop, the relative rate of flow through the different branches is of no particular concern beyond the considerations involved in transport through a single line. However, when a change of product enters the loop, as when the point of juncture between successive slugs of different product reaches the looped portion of the pipe-line it then becomes vital to maintain equal velocities in the two branches of the loop. Otherwise, the point of separation between the different products in the two arms of the loop would reach the point of re-combining to a single line at different times, resulting in blending of one product from one arm with a different product from the other arm, both feeding into the trunk line at the downstream end of the loop.

At present this situation is handled by use of air-operated rate of flow controllers. These devices are dependent for their operation upon delicate mechanisms which are prone to get out of order from time to time and, therefore, require expert supervision for their maintenance.

I disclose herein an improved apparatus of great simplicity for the required service. By use of my improved and simplified controller, the rate of flow in one arm of a pipe-line loop is directly controlled from the rate of flow in the other line.

It is a primary object of my invention to maintain the flow in the respective arms of a pipe-line loop at equal velocities during the passage of a change of product through the loop.

It is an object to obtain the aforementioned equality of flow velocities automatically and with a minimum of supervisory or maintenance effort.

It is a further object to attain the above ends by means of a simple apparatus of low cost and great reliability.

Other objects and advantages are to be realized in the practice of my invention as illustrated and described in the following specification.

Figure 2:
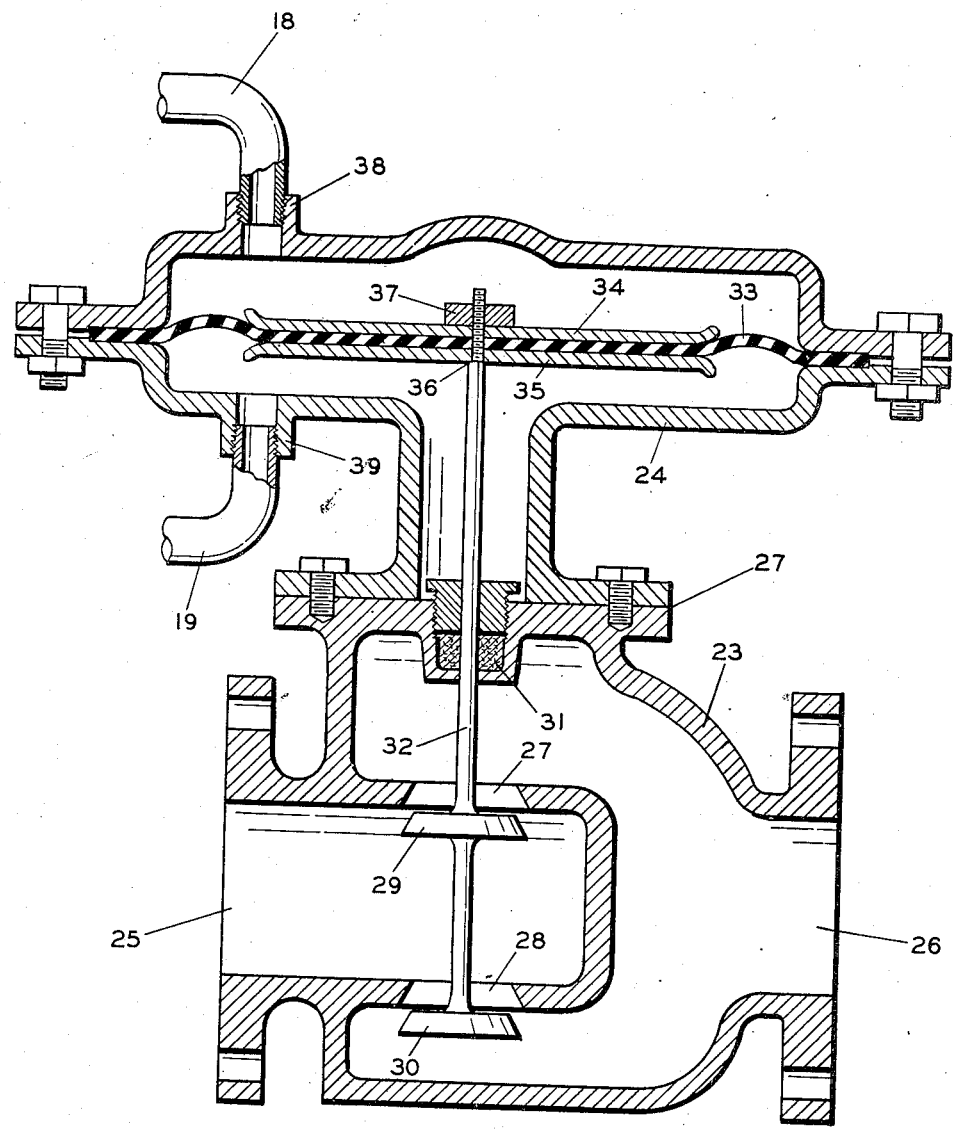

In the drawings,

Figure 1 is a plan view, partly in section, of one end of a pipe-line loop incorporating my invention, and Figure 2 is a section elevation showing the particulars of one type of control valve which is suitable for use in my control system.

Referring now to Figure 1, the numeral 10 indicates a pipe-line divided into a loop composed of parallel conduits 11 and 12, a flanged T 13 serving to interconnect the three conduits. Downstream from opposite sides of the T I provide Venturi nozzles 14 and 15 and on at least one side of the system I prefer to install a gate valve 16 or the equivalent. Further downstream in branch 11 of the loop is provided a diaphragm-controlled valve 17, opposite sides of the diaphragm being connected to Venturi nozzles 14 and 15 by pressure lines 18 and 19, respectively. A pressure line 20 branching from line 18 is connected to one terminal of a three-way plug valve 21. This valve may be of any known construction, the main requirement being that the ports in the valve plug be so arranged that one position of the valve will permit registration of pressure straight through the valve and not through line 20, while a second position of the valve plug must place lines 18 and 19 in communication so that the pressures therein will be equalized.

At any convenient point a differential pressure recorder 22 may be provided, connected with the pressure taps 18 and 19 or extensions thereof, as shown. This device may be of any particular type or, in fact, dispensed with entirely, if desired, it serving only as an observation means to check the operation of my control device.

Referring now to Figure 2, the control valve 17 is provided with a lower body portion 23 containing the valve parts and an upper body portion 24 containing the valve controlling diaphragm. The inlet 25 and the outlet 26 are each in communication through the valve ports 27, 28 when balanced valve members 29, 30 are unseated. This double-ported balanced valve structure is well known in the control valve art. A packing gland 31 is provided to seal the valve chamber from leakage into the upper structure. If the operating conditions of a particular installation are such that the pressure differential between the valve portion and the diaphragm housing is considerable, a small sealing diaphragm is preferable to a packing gland. The valve stem 32 must in any event be freely movable in an axial direction to provide sensitive response to the diaphragm 33.

The diaphragm 33 and stem 32 are secured together in suitable fashion. This may be easily done by providing upper and lower diaphrgam backup plates 34 and 35, a shoulder 36 on stem 32 and a clamp nut 37. Pressure connections 38 and 39 are provided in the walls of the diaphragm housing for connection of lines 18, 19 referred to previously in connection with Figure 1.

The downstream ends of branches 11 and 12 are joined by means of pipes 40 and 41 and T 42 to single pipe line 43. Obviously, any type of branching pipes may be used instead of T's in order to reduce friction loss. Also venturis 14 and 15 can be any place in their respective branches, it being possible to locate valve 17 upstream of venturi 14 if desired.

In operation, my control system operates in the following manner. In many cases, pipe-line loops are made up of a new line laid parallel and connected to an old one which has previously operated as a single line. In such circumstances, control valve 17 should be installed in the new line. If both lines are of new construction or are of equal age, the relative flow capacities of the two lines should first be determined by orifice meter readings of flow rate at equal differentials or by any other convenient means. In any event, the flow controller 17 should be installed in the line which has the least friction as determined by the above.

Assuming that the branch 11 of Figure 1 is the "faster" of the two arms of the loop, the throat of venturi 14 should be connected by line 18 to the upper connection 38 of the diaphragm housing on valve 17. It is understood that the Venturi throats are to be of equal diameter if lines 11 and 12 are of equal diameter, and that if lines 11 and 12 are of different diameters, then the Venturi throats are to be of proportionate diameters.

Keeping these conditions in mind, it is apparent that as long as the velocity of flow through lines 11 and 12 remains at equality, the pressures registered in lines 18 and 19 will be equal and, therefore, the diaphragm 33 of control valve 17 will be balanced and valve members 29, 30 will not move from that position which maintains flow in line 11 equal in velocity to that in line 12. If the velocity should for any reason tend to increase in line 11, a reduction of pressure in line 18 will occur, acting on the upper side of diaphragm 33 to move valves 29 and 30 toward the closed position, thus bringing the flow velocity back to equality with that in line 12, and re-establishing equilibrium of pressures in lines 18, 19. Thus by corresponding reactions of the diaphragm valve in response to changes of presure in the Venturi throats, deviation of flow velocity through line 11 in either direction from that velocity at any instant existing in line 12 will be automatically corrected.

Since this control equipment is only required when a change of products is going through the looped section, it is sometimes desirable to make the control valve 17 inoperative and thus cause no restriction to the flow if no change of products is going through the loop 11, 12. To do this all that is necessary is to operate the three-way valve 21 which is installed so as to throw the pressure from one throat to both sides of the diaphragm 33, thus cutting off the pressure of the other throat. Since the diaphragm then has the same pressure on each side, the weight of the diaphragm and valve parts 34, 35 will open the control valve wide open and cause no restriction to the flow.

The appended drawings are representative of a preferred embodiment of my invention, and are not to be construed as limiting my invention to the specific form disclosed.

I claim:

1. In a liquid transfer system in which unlike liquids are transmitted in slugs through said system, the combination of a first single pipe section of relatively great extent, a second single pipe section of relatively great extent, a pair of connecting pipe sections of relatively great extent each connecting said first pipe section to said second pipe section, and means for controlling the flow through one pipe section of said pair of connecting pipe sections actuated by the relative velocities of flow through said connecting pipe sections so that the velocity of flow in said connecting pipe sections is equalized whereby the mixing of two consecutive slugs of unlike liquids due to unequal velocities through said connecting pipe sections will be substantially avoided.

2. In a fluid transfer system in which unlike fluids are transmitted in slugs through said system, the combination of a first single pipe section, a second single pipe section, a pair of connecting pipe sections of relatively great extent each connecting said first pipe section to said second pipe section, and means for controlling the flow through one pipe section of said pair of connecting pipe sections actuated by the relative velocities of flow through said connecting pipe sections so that the velocity of flow in said one pipe section of said pair is made of such ratio to the velocity of flow in the other pipe section of the pair that the time of travel through each of the connecting pipe sections of all portions of fluid entering said respective connecting pipe sections at the same time is substantially the same, whereby the mixing of two consecutive slugs of unlike fluids due to different times of travel through said connecting pipe sections will be substantially avoided.

3. A liquid transfer system as claimed in claim 2 in which additional means is provided for holding said controlling means in open position when equal velocities of flow are not necessary and increased flow is desired.

GERALD P. JENNINGS.